United States Patent [19]
Tanaka

[11] Patent Number: 5,452,472
[45] Date of Patent: Sep. 19, 1995

[54] RADIO COMMUNICATION RECEIVING DEVICE DETECTING A FREQUENCY MODULATION PREAMBLE SIGNAL

[75] Inventor: Kiyoshi Tanaka, Chiba, Japan

[73] Assignee: Uniden Corporation, Ichikawa, Japan

[21] Appl. No.: 86,857

[22] Filed: Jul. 7, 1993

[30] Foreign Application Priority Data

Aug. 24, 1992 [JP] Japan .................. 4-245969

[51] Int. Cl.6 .............................................. H04B 1/16
[52] U.S. Cl. .................... 455/38.2; 455/205;
455/343; 340/311.1; 340/825.44
[58] Field of Search .............. 455/38.1, 38.2, 38.3,
455/343, 32.1, 228, 67.1, 226.1, 227, 229, 205;
340/311.1, 825.44

[56] References Cited

U.S. PATENT DOCUMENTS

| | | | |
|---|---|---|---|
| 4,839,639 | 6/1989 | Sato et al. | 455/343 |
| 5,142,699 | 8/1992 | Sato et al. | 455/343 |
| 5,230,084 | 7/1993 | Nguyen | 455/343 |

*Primary Examiner*—Reinhard J. Eisenzopf
*Assistant Examiner*—Nguyen Vo
*Attorney, Agent, or Firm*—Oblon, Spivak, McClelland, Maier & Neustadt

[57] ABSTRACT

A radio communication receiving device performs prescribed operations upon detecting a frequency modulation preamble signal consisting of a series of alternating logical values. The device includes a low-pass filter that is connected to an output of a receiver that detects the frequency modulation signal and outputs an analog base band signal, and which has a numerical cutoff frequency value that does not exceed half the bit rate of the preamble, a comparison circuit that is connected to the output of the low-pass filter and compares an output voltage of the low-pass filter with prescribed threshold values, and a determining circuit that determines a preamble has been detected when the comparison by the comparison circuit indicates that an absolute value the low-pass filter output voltage does not exceed a prescribed threshold value for a prescribed time period.

26 Claims, 4 Drawing Sheets

RADIO COMMUNICATION RECEIVING DEVICE DETECTING A FREQUENCY MODULATION PREAMBLE SIGNAL

BACKGROUND OF THE INVENTION

1. Field of the Invention

The present invention relates to a radio communication receiving device, and more particularly to a paging receiver that is activated by its detection of a preamble sent via a radio frequency carrier and thereby starts receiving digital code data that follows the preamble.

2. Description of the Prior Art

The radio paging receiver known internationally as a pager and in Japan as a "pocket bell" is one of the representative types of radio communication receiving device used to receive a digital signal code transmitted by radio. The present invention will be more readily understood if described in terms of an improvement to this type of pager (radio paging receiver) and such a pager will therefore now be described, with reference also to the prior art.

POCSAG is a coding protocol extensively used by pager systems for radio transmission of data. The data stream transmitted at a designated radio frequency from a transmitting base station to the individual pagers in accordance with this protocol is illustrated in FIG. 4.

As shown, first comes a preamble data section of alternating logical "1s" and "0s" forming a serial bit stream "1010 ... 10" of at least 576 bits. This preamble data is followed by an arbitrary number of data batches 1, 2, 3, .... Each data batch starts with a specific synchronization code Sc which is followed by eight data frames numbered #0 to #7. In FIG. 4, frame #4 is shown in magnified detail, from which it can be seen that each such frame consists of a pair of code words 10 and 20, each 32 bits long. In accordance with the POCSAG format, bit allocation in each data frame is as follows.

The first bit (bit #1) in each of the code words is the address/message flag 11 (code word 10) and address/message flag 21 (code word 20). As shown, when the bit value of the address/message flag 11 is logical 0, the code word is address code word 10, and when the bit value of the address/message flag 21 is logical 1, the code word is message code word 20.

In the address code word 10 the 18-bit portion from bit #2 to bit #19 represents address data 12 for calling the pager having the same ID code, and bits #20 and #21 are for function data 13, which as 00, 01, 10 or 11 can designate four functions. The group of bits from #22 to #31 are BCH (Bose-Chaudhuri-Hocquenghem code) bits 14, and the final bit #32 is a parity bit.

When a 32-bit code word is a message code word, which is when the address/message flag bit #1 is logical 1, it consists of bits #2 to #21 representing message data 22, bits #22 to #32 as the BCH bits 23, and error-correction parity bits 24. The POCSAG message protocol does not limit the length of a message; when the message is long, code words of the next and subsequent data frames can also be used for the message. Message code words can also be stored in the data frames that follow the synchronization code Sc in each of the subsequent batches.

BCH bits 14 and 23 and parity bits 15 and 24 are used for correcting errors that occur in the data transmission process and for checking the results of such corrections. These are known techniques having no direct bearing on the present invention, and as such, further details thereof are omitted.

Each pager that conforms to the POCSAG transfer format is assigned at least one ID code, and especially nowadays may be provided with a plurality of such codes. FIG. 5 shows a typical pager according to the prior art. With reference to FIG. 5, ID codes are stored in an ID code memory 39 in the pager 30. These memories are usually programmable read-only-memories (PROMs) or, more recently, electrically-erasable PROMs (EEPROMs).

Pagers such as pager 30 are portable units which run off a battery power source 40. To enable the pager 30 to be used for extended periods, the POCSAG format incorporates battery-power saving or conservation features. More specifically, the pager 30 has a receiver 32 which uses an antenna 31 to detect, and then demodulates, radio signals of a specific frequency representing the logical values of each of the data bits transmitted in accordance with a frequency-modulation system, which is generally frequency-shift keying (FSK), and a waveshaping circuit (also known as a digital detector) 33 that processes the output of the receiver 32 to enable it to be read as a digital signal, and battery power is supplied intermittently at time intervals $\Delta T$ to both the receiver 32 and wave-shaping circuit 33, or at least to the receiver 32. For this, in the case of the illustrated arrangement, a control circuit set is incorporated in a decoder 34, described below. Nowadays the tendency is to use a microcomputer 35 as a pager controller, in which case the microcomputer 35 may be one that can be switched into a low-power-consumption low clock mode when the supply of power to the receiver 32 or to the receiver 32 and wave-shaping circuit 33 is shut off.

FIG. 4 shows the receiver mode waveform. As shown, in the ON mode, the application of power from the battery to the receiver 32 (FIG. 5) is followed by a receiver stabilization period of from several milliseconds to over ten milliseconds. In the OFF mode the power supply is shut off and the receiver 32 assumes a resting state. Putting the receiver 32 into the ON mode basically means turning the pager on, and putting the pager into the OFF mode means turning it off.

The receiver 32 is switched on at periodic time intervals $\Delta T$ by a power supply control circuit provided with a time measuring function, located in the decoder 34. The receiver 32 mode switches to off if a preamble is not detected by the completion of the fixed time the ON mode is maintained, in which case the mode will be switched to on after the lapse of the prescribed time interval $\Delta T$. Still with reference to FIG. 4, when a preamble is detected during the ON mode, the receiver 32 stays on and receives the synchronization data or synchronization code Sc that follows. The receiver 32 mode then switches to off until a predetermined data frame, for example frame #4, is received by the pager, and after the elapse of the time required to receive frame #4, the receiver 32 goes into the ON mode, and stays in that mode until the data in frame #4, and in subsequent data frames if it is a long message, has been received (and demodulated and decoded), after which it switches back off.

The POCSAG format has been planned so that the ID codes assigned to pagers enable each pager to determine which frames to read. Except for some special codes, any arbitrary number from decimal 0 to 2097152 ($2^{21}$) can be utilized as a POCSAG-format code. However, FIG. 4 shows that only 18 bits are available for matching address data 12 and ID codes, as the three low-order bits are set aside for frame designation purposes. These three low-order bits can be used to represent binary 000 to binary 111 or decimal 0 to decimal 7. Thus, if a pager has been assigned a plurality of ID codes in which the three low-order digits thereof are all the same, each of the ID codes can be designated by the remaining high-order 18 digits and all of the ID codes can be assigned to the same frame. For example, if a pager is assigned a plurality of ID codes and frame #4 is designated, in assigning ID codes, numbers should be chosen from decimal 8 to 2097152 that when divided by 8 leave 4, such as 12, 20, 28, for example. Associating all ID codes with the same frame maximizes the effect of the above battery-saving function, as having to check a different frame for each ID code would increase the length of time the receiver is on, thereby draining the battery more quickly. While not directly prescribed by the POCSAG protocol, conventionally the numbers from decimal 0 through 7 are not used for ID codes, as using these numbers would make it possible for all the bits in an address code word 10 to be zeros, increasing the risk of errors.

Thus, it should be possible to expect good battery conservation with the POCSAG format. However, with respect to the frame set for each pager, for example frame #4, again with reference to FIG. 4, with bit #1 of the first code word being logical 0, meaning address code word 10 when the flag 11 is 0, the pager's decoder 34 compares the address data 12 bits #2 to #19 against all of the ID codes assigned to that pager. Also, if there are no ID codes that match the address data 12 the receiver 32 switches off, and switches back on after a prescribed time $_\Delta T$. If the address data 12 input to the decoder 34 matches any of the ID codes, the pager continues with the execution of the prescribed service function. It will be understood that "matching" as used herein refers not only to strict one-to-one identity, but also to broader types of correspondence, including look-up tables, and other comparison means.

The four types of function data 13 can each represent a designated function A, B, C, or D. For example, function data 00 could be used to designate function A to cause the pager speaker, or "beeper," 42 to emit two long beeps in succession, and, if required, to add a letter A at a prescribed position on a display 41 when message data is displayed on the display; function data 01 could correspond to a function B whereby the speaker 42 emits a short beep followed by a long beep and a letter B is displayed on the display 41; function data 10 could correspond to function C for two short beeps and a letter C displayed on the display 41; and function data 11 for function D might be used to cause the speaker 42 to emit four short beeps and display a letter D on the display 41. Functions A to D can be used for other purposes, such as control data for over-the-air remote programming to rewrite data in pagers in accordance with radio transmissions from a transmitting base station. However, as this has no direct relationship with the present invention, further description thereof is omitted.

When the decoder 34 confirms that there is a match between received address data and any of the ID codes assigned to the pager, the decoder 34 puts the microcomputer 35 into a high-clock mode (when the system has such a mode-switching capability), following which the second code word, message code word 20, is received and message data 22 is decoded, and BCH bit 23 and parity bit 24 are used to correct decoding errors and check the correction result, in accordance with a known process. Under the control of the microcomputer 35 the message data 22 thus checked is stored in a message memory, together with message data from subsequent frames if the message is a long one.

When the transfer of the message data has been completed, an alert means such as the speaker 42, a motor-driven vibrator 43 or a light-emitting diode (LED) 44 is activated to notify the pager user that a new message has been received. If the speaker 42 is used, for example, it might emit a preset beep pattern in accordance with function data 13. In some pagers the message is displayed simultaneously with the activation of the alert means, but usually the user will operate keys 38 to retrieve the message from memory and display it in alphanumeric form on the display 41, at a time chosen by the user. In the case of displays capable of displaying English characters, the display of a message is usually accompanied by the display at a specified position of one of the characters A to D corresponding to function data 13.

This pager is provided with all these alert means. Some pagers contain information to determine which means to use, stored for example in EEPROM 39, to enable the user to select which alert means is used. Some pagers may be provided only with the speaker 42 and the vibrator 43. Again, however, as these have no direct bearing on the present invention as described below, no further details thereof are included. The message memory area is usually capable of storing multiple messages. Messages can be sent to the display 41 in the order in which they arrive or in another order, such as the most recent message first. This too has no direct bearing on the present invention, so further details thereof are omitted.

When storage of the message data has been completed the receiver 32 is switched back into the OFF mode by the power control circuit in the decoder 34, and is periodically turned on at time intervals $_\Delta T$ until the next preamble is detected.

Each of the ID codes assigned to a pager is reserved to carry out a designated function. Assuming that a pager has been assigned the codes 1, 2 and 3 (although nowadays a pager usually has a larger number of codes), the first code 1 can be assigned to just one pager. As such, when the transmitting base station transmits address data which matches that ID code, only the alert means of that pager will be activated to page the user. This ID code can therefore be termed an "individual call" code. In contrast, by assigning the second ID code, ID code 2, to a plurality of pagers furnished to a group of people having some type of relationship such as, for example, a group of employees in a company, all of those pagers can be activated by transmitting address data that matches ID code 2, making it a "group call" ID code. ID code 3 can be used as an individual call code, but when used to page the user can for example cause the speaker 42 to emit a special type of beep and a letter "U" to be displayed at a specific location on the display 41. Thus, ID code 3 can be used for "urgent calls." In recent years, particularly in the U.S., various paging pay services have been thought of. There is a mail drop service which can be used to periodically display stock prices, for example. As there are designated ID codes for each service, the demand now is for pagers in which four to six ID codes can be provided, and it seems clear that the future demand trend will be for more codes.

While in the foregoing description the decoder 34 decodes preambles, synchronization codes and code words in accordance with a digital pulse train that appears in the output of the wave-shaping circuit 33, in principle the detection and decoding circuits can be implemented as separate hardware components. Even with a limited number of input/output ports, as the speed and capacity of microcomputers continue to increase it will become possible for the functions of the decoder 34 to be taken over by the microcomputer 35. As mentioned, the integrated-circuit modules that form the decoders used in today's pagers incorporate power supply circuit sets that are provided with battery-saving time-measurement functions (i.e., timing control functions), and these can of course be implemented as separate, discrete circuits. Also, when control of the clock mode of the microcomputer 35 is not implemented, software processing can be used to utilize the microcomputer 35 itself as a circuit that controls the supply of power to each circuit in accordance with a prescribed timing. This can also apply to the decoder 36 and power supply limiting circuit 56 described in the embodiments of the invention.

Thus, in this type of radio paging receiver substantially all functions start with preamble detection. This is a measure of the importance of the preamble detection: obtaining the digital data concerned and the timing control for the battery-saving feature both depend on the accuracy of the detection. It is desirable to be able to perform high-sensitivity detection even when there is a poor carrier-to-noise (C/N) ratio. On the other hand, in view of the portable, battery-driven nature of radio paging receivers, the component circuits thereof should be as small and simple, and consume as little power, as possible.

From that standpoint there is still room for improvement in the above-described conventional preamble detection system. With the conventional system all of the analog base band signals appearing in the FM detection output of the receiver 32 are given a digital waveform by the wave-shaping circuit 33 and then applied to the decoder 34. However, to reduce the size of circuits most such decoders 34 are comprised of integrated-circuit modules which incorporate many functions. Therefore during the decoding process used to ascertain whether or not the train of digital signals being thus input is a preamble, power is also being supplied to operate all of the other function parts in the decoder, for example to the circuit that is used to perform parallel comparisons of incoming address data and each of the ID codes that are transferred from the EEPROM 39 to a buffer memory by the microcomputer 35 when the power is turned on. At least up until the point at which a preamble is detected, this is a waste of electric power. Moreover, at the present stage this is less than perfect in terms also of performance; while digital processing may have been applied a high C/N ratio is not obtained, and in fact an internal noise problem may arise.

OBJECT AND SUMMARY OF THE INVENTION

The object of the present invention is to provide a radio communication receiving device that has a preamble detection function that is simple and highly reliable, at the time of preamble detection is able to activate only the circuits required for that preamble detection, and provides a high level of performance.

To attain the above object, the radio communication receiving device of this invention handles digital signals but is based on a concept whereby the parts that are needed are not involved with digital processing (the usual concept, as illustrated by the prior art example in FIG. 5, has been to use digital signal processing throughout, starting with receiver detector output) and, in view of the special nature possessed by a preamble defined by a series of alternating reversals of logical 1s and 0s, is comprised as follows.

Connected to the output of a receiver that detects frequency-modulated signals and outputs analog base band signals is a low-pass filter having a numerical cut-off frequency value that does not exceed half the bit rate of the preamble to be detected. The output of the low-pass filter is connected to a comparison circuit provided for comparing the output voltage of the low-pass filter with a prescribed threshold value. A determining circuit is provided that determines a preamble has been detected when the comparison by the comparison circuit shows that at absolute value the low-pass filter output voltage has not exceeded the prescribed threshold value for at least a prescribed time period.

The above pager can be provided with an internal microcomputer that forms the main control circuit and can also be used for the determining circuit. However, for reasons relating to the battery conservation described below it is more advantageous to have the low-pass filter and comparison circuit provided separately from the microcomputer as a preamble detection circuit module.

As one embodiment of this invention that satisfies the basic configuration described above, there has been proposed a radio paging receiver having a pair of threshold values that, when the analog base band signal that is the receiver detection output oscillates equally positively and negatively relative to a reference level, at their absolute value the prescribed threshold values are mutually equal relative to the reference potential, and in the positive and negative polarity signs are reversed. In accordance with another embodiment of this invention, the output voltage of the low-pass filter is applied to the comparison circuit via a full-wave rectifying circuit and the threshold value to be applied to the comparison circuit is a single-threshold value that is positive relative to the reference bias. Generally the reference bias is zero potential (including an unavoidable offset), but if required a direct-current voltage offset may be intentionally applied.

In a further proposal in which the radio paging receiver according to this invention is provided with a low-pass filter and comparison circuit, or a full-wave rectifying circuit, the preamble detection circuit is a module that includes the full-wave rectifying circuit, and there is a prescribed time period between when power is supplied to the preamble detection circuit module and when power is supplied to the receiver.

In a radio paging receiver thus arranged in which a wave-shaping circuit for shaping analog base band signals into a digital waveform is connected to the receiver output, and a decoder for decoding the thus-shaped digital waveform is connected to the output of the wave-shaping circuit, an improvement according to the present invention comprises an arrangement that includes the provision of power supply control means whereby when power is being supplied to the receiver and preamble detection circuit module, the supply of power to the wave-shaping circuit and decoder is suspended, and when the determining circuit determines that a preamble has been detected, the supply of power to the preamble detection circuit module is stopped and the supply of power to the receiver is maintained while the power is also supplied to the wave-shaping circuit and decoder.

Other objects and features of the invention will become clear from the following detailed description made with reference to the accompanying drawings.

DESCRIPTION OF THE PREFERRED EMBODIMENTS

Figure 1:
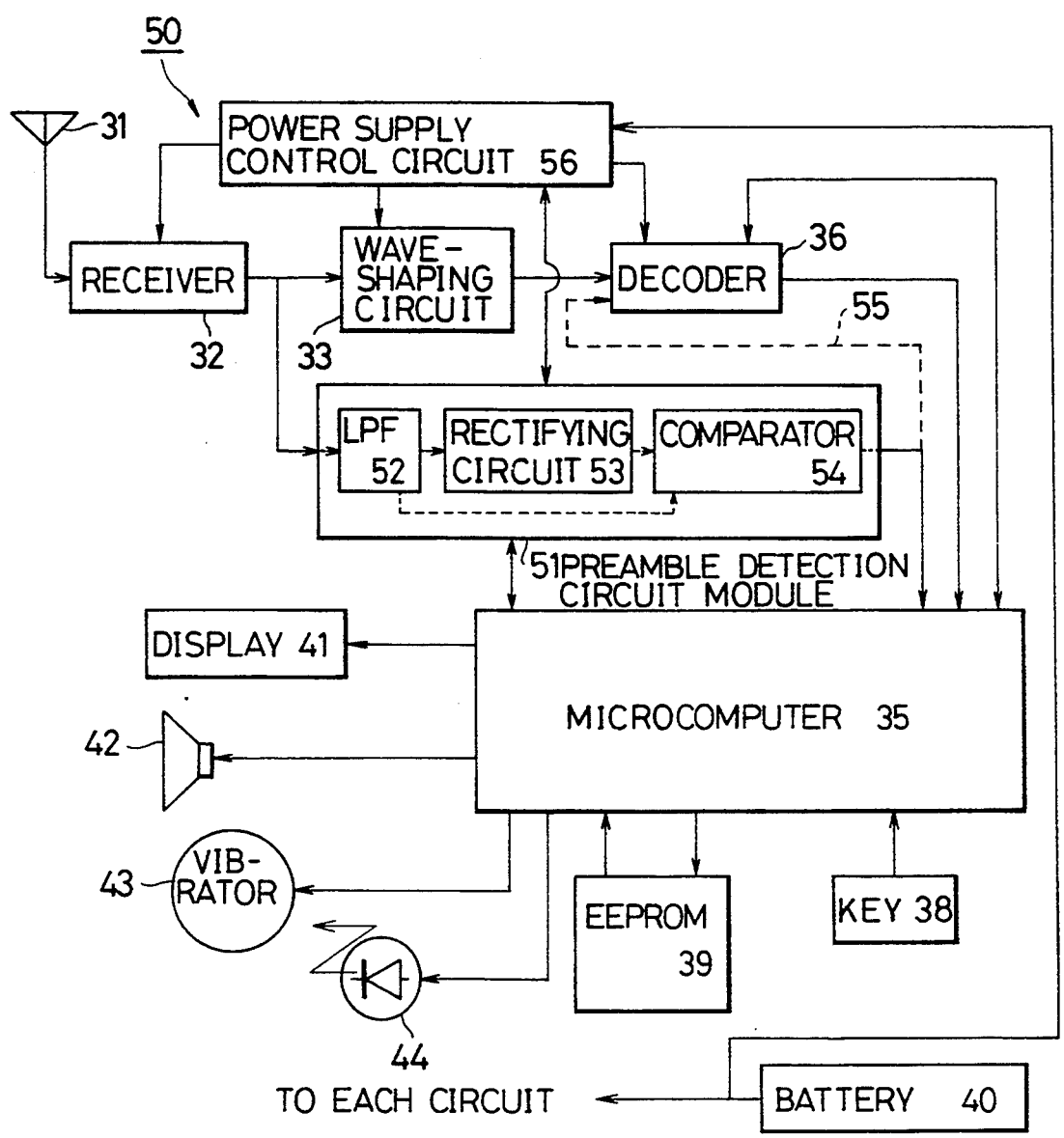
FIG. 1 is an outline circuit schematic diagram of an embodiment of a radio paging receiver arrangement according to the present invention.
Figure 4:
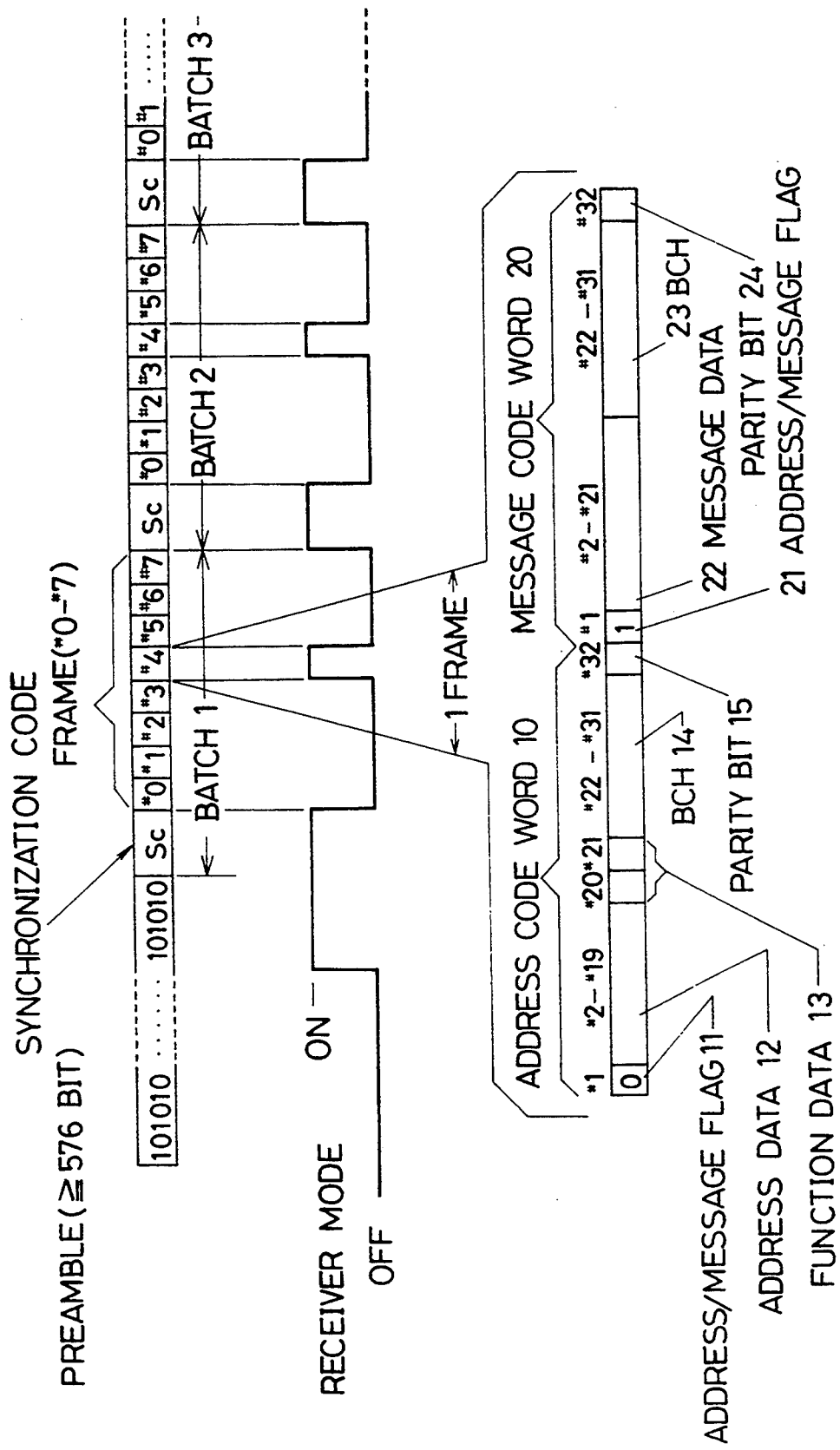
FIG. 4 is a diagram illustrating the format of the POCSAG radio paging receiver communication protocol, together with the operation of the receiver.
Figure 5:
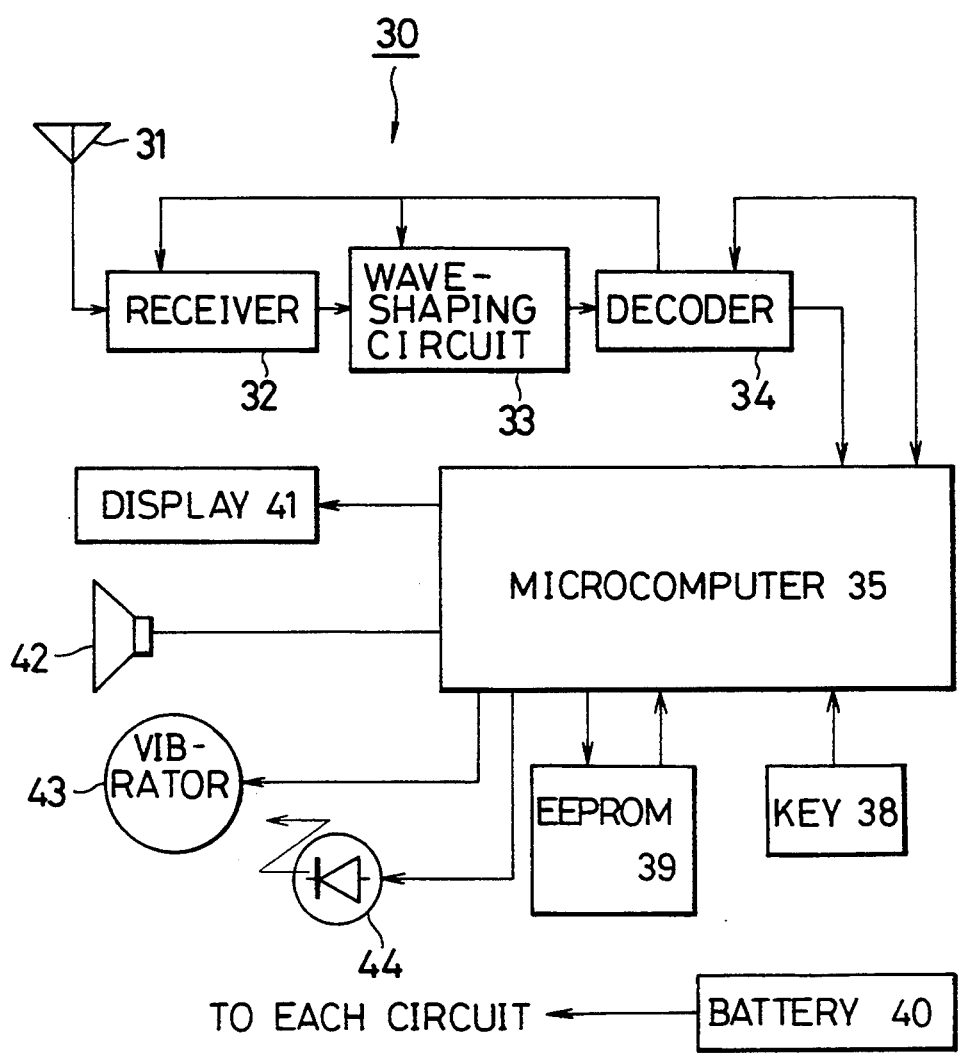
FIG. 5 is an outline circuit schematic diagram of a conventional radio paging receiver arrangement.

FIG. 1 shows an embodiment of a radio paging receiver 50 that can realize the principle of the present invention; the radio paging receiver 50 is a multi-ID code type such as the one shown in FIG. 5. The radio paging receiver 50 is arranged to conform to the POCSAG coding protocol described above. As such, the basic operations described with reference to the prior art radio paging receiver 30, and the description relating to the POCSAG format made with reference to FIG. 4, can be applied with virtually no change to this embodiment, and like parts have therefore been given the same reference symbols. Thus, with the exception of those parts which embody the distinguishing features of this invention, the arrangements and operating principles of conventional radio paging receivers can be utilized.

With reference to FIG. 1, the radio paging receiver 50 has a receiver 32 which, via an antenna 31, receives a frequency modulation radio signal of a prescribed frequency and demodulates and outputs the signal as an analog base band signal. The output of the receiver 32 is connected to the input of a wave-shaping circuit (digital detector) 33. After a preamble is thereby detected by the mechanism of this invention described below, the demodulated signal is formed by the wave-shaping circuit 33 into a waveform and data stream that can be read as a binary digital logic signal which is then decoded by a decoder 36. Concerning subsequent operations that take place in response to the information contained in the decoded signal, the description given with reference to the prior art arrangement may be taken as having substantially the same application to this embodiment.

However, unlike a conventional arrangement the decoder 36 of this embodiment does not require the functions relating to preamble detection and therefore has a correspondingly simpler circuit system. The present embodiment is an example according to a preferred specific format which uses an external power supply control circuit 56 equipped with a time measurement function for battery saving, so the decoder 36 does not require the control circuit which is incorporated in the decoder 34 used in the prior art radio paging receiver arrangement.

Thus, the power supply control circuit 56 has a function for measuring time for which a clock (not shown) is input thereto, and is provided to enable specific circuits to be intermittently supplied with electric power from a battery power source 40, at a prescribed timing and for a prescribed duration. When the radio paging receiver 50 is in standby mode, at prescribed time intervals $\Delta T$ the receiver 32 connected to the antenna 31 and a preamble detection circuit module 51, which is a new addition of this embodiment, are supplied with electric power from the battery power source 40. This intermittent operation is done for battery-saving purposes.

When power to the decoder 36, and to the receiver 32 and preamble detection circuit module 51, is shut off, that is, when battery power to the receiver 32 and power supply control circuit 56, and to digital signal processing system which includes the decoder 36 and the wave-shaping circuit 33 is shut off, the microcomputer 35 that forms the main control circuit in this embodiment issues a low clock mode operating control signal which reduces power consumption by the microcomputer 35. In practical terms, therefore, during the time period $\Delta T$ the power supply control circuit 56 functions as the control means for the various functions.

A PROM, or more preferably an EEPROM 39, as shown, is associated with the microcomputer 35. At least one, more usually multiple, ID codes are stored in the EEPROM 39 together with the various information needed for operation of the radio paging receiver 50 such as that used to select which of the alert means 41, 42 and 43 to use. For high-speed processing and lower power consumption, after a power switch (not shown) is used to provide the initial power the data is read out by the microcomputer 35 and transferred to associated random-access memory (RAM) areas for use.

When during the course of the on/off switching of the receiver 32 at prescribed time intervals $\Delta T$ the antenna 31 picks up an FSK modulation preamble transmission whereby the preamble is in the form of a series of alternating logical 1s and 0s, the analog base band signal output of the receiver 32 forms a periodic waveform with a frequency that is half the bit rate of the preamble signal.

Figure 2:
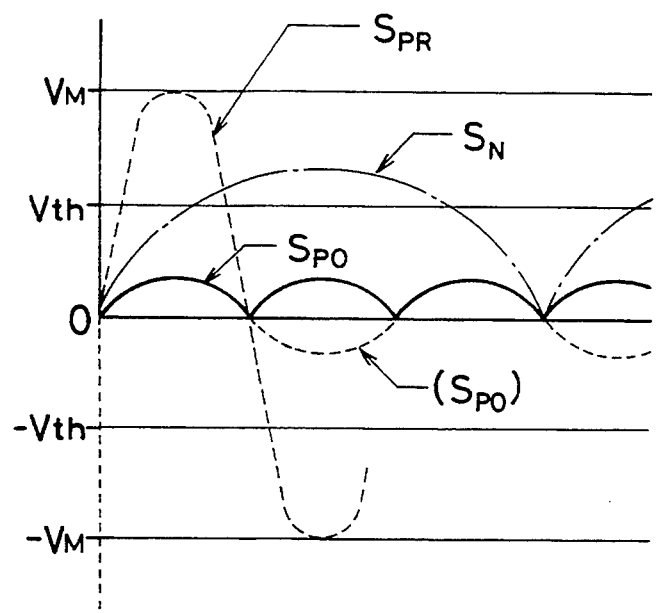
FIG. 2 is a diagram illustrating the operation of the preamble detection circuit in the radio paging receiver shown in FIG. 1.

In FIG. 2, the analog base band signal waveform at this point is indicated by a phantom line as receiver output signal $S_{PR}$. Modern radio paging receivers have a bit rate of 1.2 Kbps, so the frequency of the $S_{PR}$ will be 600 Hz. Many paging receivers still in use operate at 512 bps, in which case the frequency of the $S_{PR}$ would be 256 Hz. In the near future pagers will be using 2.4 Kpbs, giving an $S_{PR}$ of 1.2 KHz. The positive and negative peak voltages $V_M$, $-V_M$ of the receiver output signal when receiving the preamble signal $S_{PR}$ usually equal the circuit system positive and negative power supply voltages. Also, in the example shown, the $S_{PR}$ uses zero potential as the reference level and forms a waveform with an equal positive and negative oscillation having an absolute value $V_M$, but there may be cases in which unavoidable offset is removed and then a direct-current voltage offset intentionally applied. For example, when an offset of $\pm x$ volts is applied, the reference level may be read as this $\pm x$ volts in place of the zero volts shown in FIG. 2. This can also be applied to circuit systems that use a unipolar power source. A potential that is half the voltage of the unipolar power source may for example be used as the reference level.

As mentioned, during standby the power supply control circuit 56 only supplies power to the receiver 32 and the preamble detection circuit module 51, so when preamble information is detected by the antenna 31 the receiver output signal $S_{PR}$ is processed only by the preamble detection circuit module 51, which is in operation. The preamble detection circuit module 51 of this embodiment has a low-pass filter 52 at its input stage, and after passing through a full-wave rectifying circuit 53 the output of this low-pass filter 52 can be applied directly to a comparator 54.

The $-6$ dB cutoff frequency of the low-pass filter 52 is set at a frequency that is numerically equivalent to no more than half the bit rate relating to the preamble. Thus, for a bit rate of 1.2 Kbps a cutoff frequency of no more than 600 Hz would be selected for the low-pass filter 52. With such an arrangement, even if a receiver output signal $S_{PR}$ having a peak voltage of $\pm V_M$ is input to the low-pass filter 52, it is possible to obtain a signal in which the peak voltage is compressed. In FIG. 2 this signal is shown as filtered preamble signal $S_{PO}$, a periodic signal alternately connecting the solid and phantom lines.

In this embodiment the low-pass filter 52 output is also passed through the full-wave rectifying circuit 53, whereby the negative component of the filtered preamble signal $S_{PO}$ appearing in the low-pass filter output is reversed to the positive side, forming the signal indicated in FIG. 2 as a succession of solid lines. The filtered preamble signal $S_{PO}$ thus processed is then compared with a prescribed threshold value Vth by the comparator 54. This clearly shows that the peak voltage $\pm V_M$ of the receiver output signal $S_{PR}$ is sufficiently compressed by being passed through the low-pass filter 52. As such, when a preamble is detected the voltage value of the filtered preamble signal $S_{PO}$ can be made to be always low relative to the threshold value Vth set in the comparator 54, or the threshold value Vth can be set to achieve the same result. However, to the extent that this condition can be maintained, as a rule it is preferable for the threshold value Vth to be low with respect to power supply potential $V_M$, as in the standby mode this makes it easier to avoid erroneous responses caused by noise.

Figure 3:
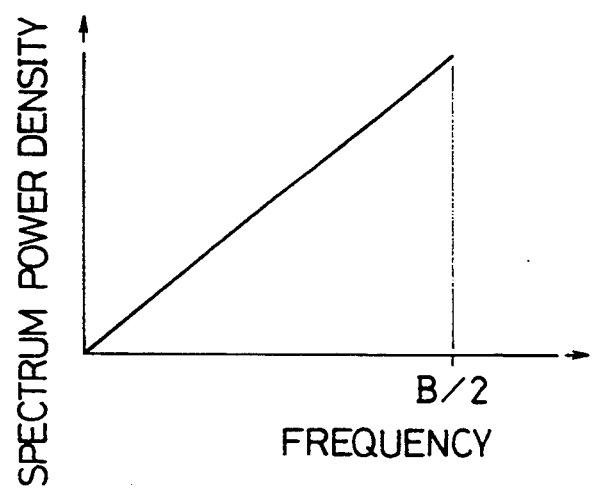
FIG. 3 is an illustrative diagram relating to triangular noise appearing in the FM demodulation output of the receiver in the radio paging receiver of FIG. 1.

More specifically, when the antenna 31 does not pick up a preamble frequency signal during one of the periods when power is being supplied to the receiver 32 and preamble detection circuit module 51, there is a tendency toward a white noise type of detection output by the receiver 32. Shown in terms of the spectrum power density plotted against one half the receiver bandwidth B (for example, B/2 equals 8 kHz when the receiver bandwidth is 16 kHz), this produces the type of (triangular) noise spectrum of FIG. 3. With the inclusion of frequency components exhibiting a high voltage down to frequencies that are even lower than the set cutoff frequency of the low-pass filter 52, when these components are passed via the low-pass filter 52 and full-wave rectifying circuit 53 to the comparator 54, it produces frequency components that exceed the set threshold value Vth, shown in FIG. 2 as noise signal $S_N$.

This being the case, during the periods when power is being supplied to the preamble detection circuit module 51, by maintaining the signal input to the comparator 54 at a level that is lower than the threshold value Vth set in the comparator 54 for a prescribed time that is not less than half a cycle of the preamble detection signal frequency, and preferably is of several cycles' duration for a larger margin, thereby maintaining the output of the comparator 54 at a specific logic level state, for example a low level state, it becomes possible to determine that a preamble has been detected.

The microcomputer 35 can be used to form the determining circuit used for this purpose. However, when the microcomputer 35 can be switched between high and low clock modes, when a low level state signal is manifested in the output of the comparator 54 and the microcomputer 35 is immediately switched to its high clock mode, it is necessary to ensure that it can function to determine whether or not the output signal of the comparator 54 is maintained low for the prescribed length of time. This is of course not necessary when there is no mode switching capability. The determining circuit may be provided as a separate component, incorporated for example into the preamble detection circuit module 51. However, even when the microcomputer 35 is also used as the determining circuit component, implementing the preamble detection as a separate circuit component is advantageous in terms of conserving the battery. This is because the operating mode of the microcomputer 35 itself can be changed.

Something that has always been a design problem concerns how long the output of the comparator 54 should maintain a low-level state to determine whether a signal is a preamble. Conventional paging receivers required from ten milliseconds to several tens of milliseconds. A setting with this range can be applied to the present invention, or a shorter setting can be used.

As indicated in FIG. 1 by the dotted bypass line 55, the full-wave rectifying circuit 53 can be omitted and the output of the low-pass filter 52 applied directly to the comparator 54. With this configuration the filtered preamble signal $S_{PO}$ applied to the comparator 54 has a negative component, indicated by the parentheses in FIG. 2, so the comparator 54 should be set using a pair of threshold values $\pm$Vth which relative to the reference level have the same absolute values but opposite polarity signs. By doing this, the output of the comparator 54 will assume the prescribed level state only when a filtered preamble signal $S_{PO}$ is input having a value that is smaller than absolute threshold value Vth, thereby enabling filtered preamble signal $S_{PO}$ to be detected.

Following the detection of filtered preamble signal $S_{PO}$ the power supply control circuit 56 continues to supply power to the receiver 32 and also supplies power to the wave-shaping circuit 33 and decoder 36. Paging receiver operation from detection of the synchronization code Sc onward is the same as that already described in the foregoing. The power supply to the preamble detection circuit module 51 can be stopped as it is then no longer required.

Provided that the cutoff frequency of the low-pass filter 52 is limited to a numerical value that does not exceed half the bit rate, the cutoff frequency setting is just a matter of design preferences. However, as the cutoff frequency of the low pass filter is lowered, the noise power density (FIG. 3) is reduced and at the same time the amplitude of the filtered preamble signal $S_{PO}$ is also reduced. Having a cutoff frequency somewhat less than half the preamble frequency of the $S_{PO}$ due to reduced noise power density is beneficial. However, if the cutoff frequency is too low, the comparator will not be able to discriminate between a preamble signal and a non-preamble signal. In experiments by the inventor, good results were obtained with a cutoff frequency setting of between 35% and 31% of the bit rate.

The present invention also provides good results with respect to the C/N ratio, although this also depends on bandwidth restrictions on the transmission side. Focussing just on a positive or negative half-cycle of a detection signal and setting a threshold value Vth with respect to the that half-cycle enables the preamble detection technique of this invention to be used as a bit regeneration circuit. Accordingly, as indicated by the dotted line 55 in FIG. 1, the wave-shaping circuit 33 can be omitted by supplying power to the preamble detection circuit module 51 continuously after the detection of a preamble signal and by applying an output signal of the comparator 54 to the input of the decoder 36. In this case, good bit error performance can be attained. To confirm the effect of the invention, a bit regeneration circuit was built. With a C/N ratio that produced an error rate of $10^{-3}$ and no transmission-side base band restrictions (infinite cutoff MSK modulation frequency), the system of the present invention produced 10.2 dB, an improvement on the 10.8 dB obtained with a conventional system. With a transmission-side base band cutoff frequency of 1.4 times the bit rate, the ratio was 11.4 dB with the conventional system and 10.6 dB with this invention, and at 0.7 times the bit rate, 13.0 dB with the conventional system and 11.1 dB with this invention.

The above is a description of a preferred embodiment of the present invention and can be freely modified to the extent that any such changes do not depart from the essential scope of the invention. For example microcomputer 35 may be used for the battery-saving power supply control circuit 56 when advances in microcomputer technology provide higher speed with lower power consumption. If it is fast enough and has sufficient capacity, the microcomputer 35 could also take over the functions of the decoder 36.

The radio communication receiving device that forms the object of the present invention is not limited to the paging receiver of the above embodiment but encompasses any receiver that detects a preamble that can be defined as a series of alternating logic signals.

What is claimed is:

1. A radio communication receiving device performing prescribed operations upon detecting a frequency modulation preamble signal including a series of alternating logical values, said radio communication receiving device comprising:

a low-pass filter operably connected to an output of a receiver, said receiver detecting the frequency modulation preamble signal and outputting an analog base band signal, said low-pass filter having a numerical cutoff frequency value that does not exceed half a bit rate of said frequency modulation preamble signal;

a comparison circuit operably connected to an output of said low-pass filter and comparing an output voltage of said low-pass filter with at least one prescribed threshold value; and a determining circuit operably connected with said comparison circuit and determining that said frequency modulation preamble signal has been detected when the comparison by said comparison circuit indicates that an absolute value of said output voltage of said low-pass filter does not exceed a prescribed threshold value for a prescribed time period.

2. The radio communication receiving device according to claim 1, wherein said analog base band signal is a signal that oscillates positively and negatively relative to a reference level when said frequency modulation preamble signal is detected, and said at least one prescribed threshold value applied to said comparison circuit comprises a pair of threshold values having their absolute values mutually equal relative to said reference level and having their respective positive and negative polarity signs reversed.

3. The radio communication receiving device according to claim 2, wherein said low-pass filter and said comparison circuit form a preamble detection circuit module.

4. The radio communication receiving device according to claim 1, further comprising: a full-wave rectifying circuit, said full wave rectifying circuit being operably connected with said low-pass filter and with said comparison circuit; and, wherein said analog base band signal is a signal that oscillates positively and negatively relative to a reference level when said frequency modulation preamble signal is detected, said output voltage of said low-pass filter is applied to said comparison circuit via said full-wave rectifying circuit, and said at least one prescribed threshold value applied to said comparison circuit is a single threshold value that is positive relative to said reference level.

5. The radio communication receiving device according to claim 4, wherein said low-pass filter, said full-wave rectifying circuit, and said comparison circuit form a preamble detection circuit module.

6. The radio communication receiving device according to claim 3, wherein said receiver and said preamble detection circuit module are supplied with power at prescribed time intervals.

7. The radio communication receiving device according to claim 5, wherein said receiver and said preamble detection circuit module are supplied with power at prescribed time intervals.

8. The radio communication receiving device according to claim 6, wherein a microcomputer comprises said determining circuit.

9. The radio communication receiving device according to claim 7, wherein a microcomputer comprises said determining circuit.

10. The radio communication receiving device according to claim 6, further comprising: a wave-shaping circuit for shaping said analog base band signal into a digital waveform, said wave-shaping circuit being operably connected to said output of said receiver; and a decoder for decoding said digital waveform, said decoder being operably connected to an output of said wave-shaping circuit; and wherein when power is being supplied to said receiver and said preamble detection circuit module the supply of power to said wave-shaping circuit and said decoder is suspended, and wherein when said determining circuit determines that said frequency modulation preamble signal has been detected the supply of power to said preamble detection circuit module is stopped and the supply of power to said receiver is maintained while the power is also supplied to said wave-shaping circuit and said decoder.

11. The radio communication receiving device according to claim 7, further comprising: a wave-shaping circuit for shaping said analog base band signal into a digital waveform, said wave-shaping circuit being operably connected to said output of said receiver; and a decoder for decoding said digital waveform, said decoder being operably connected to an output of said wave-shaping circuit; and, wherein when power is being supplied to said receiver and said preamble detection circuit module the supply of power to said wave-shaping circuit and said decoder is suspended, and, wherein when said determining circuit determines that said frequency modulation preamble signal has been detected the supply of power to said preamble detection circuit module is stopped and the supply of power to said receiver is maintained while the power is also supplied to said wave-shaping circuit and said decoder.

12. The radio communication receiving device according to claim 8, further comprising: a wave-shaping circuit for shaping said analog base band signal into a digital waveform, said wave-shaping circuit being operably connected to said output of said receiver; and a decoder for decoding said digital waveform, said decoder being operably connected to an output of said wave-shaping circuit; and, wherein when power is being supplied to said receiver and said preamble detection circuit module the supply of power to said wave-shaping circuit and said decoder is suspended, and, wherein when said determining circuit determines that said frequency modulation preamble signal has been detected the supply of power to said preamble detection circuit module is stopped and the supply of power to said receiver is maintained while the power is also supplied to said wave-shaping circuit and said decoder.

13. The radio communication receiving device according to claim 9, further comprising: a wave-shaping circuit for shaping said analog base band signal into a digital waveform, said wave-shaping circuit being operably connected to said output of said receiver; and a decoder for decoding said digital waveform, said decoder being operably connected to an output of said wave-shaping circuit; and, wherein when power is being supplied to said receiver and said preamble detection circuit module the supply of power to said wave-shaping circuit and said decoder is suspended, and, wherein when said determining circuit determines that said frequency modulation preamble signal has been detected the supply of power to said preamble detection circuit module is stopped and the supply of power to said receiver is maintained while the power is also supplied to said wave-shaping circuit and said decoder.

14. The radio communication receiving device according to claim 1, wherein said radio communication receiving device is a pager that has multiple ID codes.

15. The radio communication receiving device according to claim 2, wherein said radio communication receiving device is a pager that has multiple ID codes.

16. The radio communication receiving device according to claim 3, wherein said radio communication receiving device is a pager that has multiple ID codes.

17. The radio communication receiving device according to claim 4, wherein said radio communication receiving device is a pager that has multiple ID codes.

18. The radio communication receiving device according to claim 5, wherein said radio communication receiving device is a pager that has multiple ID codes.

19. The radio communication receiving device according to claim 6, wherein said radio communication receiving device is a pager that has multiple ID codes.

20. The radio communication receiving device according to claim 7, wherein said radio communication receiving device is a pager that has multiple ID codes.

21. The radio communication receiving device according to claim 8, wherein said radio communication receiving device is a pager that has multiple ID codes.

22. The radio communication receiving device according to claim 9, wherein said radio communication receiving device is a pager that has multiple ID codes.

23. The radio communication receiving device according to claim 10, wherein said radio communication receiving device is a pager that has multiple ID codes.

24. The radio communication receiving device according to claim 11, wherein said radio communication receiving device is a pager that has multiple ID codes.

25. The radio communication receiving device according to claim 12, wherein said radio communication receiving device is a pager that has multiple ID codes.

26. The radio communication receiving device according to claim 13, wherein said radio communication receiving device is a pager that has multiple ID codes.

* * * * *